Figure 1:
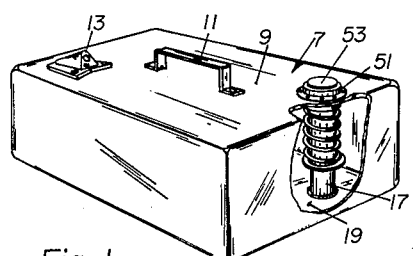

Aug. 6, 1963  J. A. COOK  3,100,000

PROPORTIONAL MEASURING AND MIXING TANK

Filed March 9, 1961

INVENTOR.

James A. Cook

BY

Buckhorn, Cheatham & Blore

ATTORNEYS

United States Patent Office 3,100,000
Patented Aug. 6, 1963

3,100,000
PROPORTIONAL MEASURING AND MIXING TANK
James A. Cook, 8809 SE. Stephens, Portland 16, Oreg.
Filed Mar. 9, 1961, Ser. No. 94,540
5 Claims. (Cl. 137—571)

This invention relates to an improvement in proportional measuring and mixing devices and more particularly to an improved proportional measuring and mixing tank suitable for use as a fuel tank to supply a mixture of gasoline and motor oil directly to outboard motors, lawn mower motors, or other motors of the two-cycle type.

Heretofore, the common practice was to supply either a premixed fuel to the supply tank or alternatively, to guess the amount of oil and gasoline to add separately in filling an empty or partially filled tank. Premixing the oil and gasoline and transferring the resultant mixture to the fuel tank is often a very time consuming, inconvenient and messy operation, particularly if it is attempted without the benefit of a proportional measuring and mixing device such as the present invention. The addition of gasoline and oil separately to a partially filled tank without the aid of a proportional measuring and mixing device involves guesswork, which is usually highly inaccurate and results in inefficient engine operation, rapid wear of engine parts and fuel waste. Prior art proportional measuring and mixing devices either are too complicated and thus impractical to be adapted to fuel tanks or else would be inconvenient to use under normal operating conditions, such as in refilling a partly empty tank.

In accordance with the present invention I provide an essentially conventional fuel tank of the sort used with outboard motors having an opening in its top surface and within which is mounted a hollow tube having a predetermined capacity proportional to the tank capacity. The tube is vertically movable by means of a lever acting bail first to a downward position against the bottom of the tank wherein the tube is filled with oil and then to an upward position away from the tank bottom wherein the tank is filled with gasoline, the result being a mixing of the two liquids in the correct proportion.

It is a principal object of my invention to provide a proportional measuring and mixing device that is adaptable to conventional fuel tanks for two-cycle motors, and more particularly is adaptable for use in fuel tanks for outboard motors.

Another object of my invention is to provide a proportional measuring and mixing tank having quick filling characteristics and having no external moving parts, which would be easily damaged.

A further object of my invention is to provide a proportional measuring and mixing tank that requires no preliminary calculations or premixing of fuel and which is simple to operate.

An additional object of my invention is to provide a fuel tank that can be easily and accurately refilled with the proper mixture of fuel regardless of the initial fuel level in the tank.

Further, it is an object of my invention to provide a proportional measuring and mixing tank having a minimum number of parts to provide a device that will be long lasting, relatively foolproof in operation, and economical to produce from either metal or plastic materials.

Another object of my invention is to provide a device which can be adapted for use in existing fuel tanks with a minimum of difficulty, and which can be removed readily from a fuel tank and replaced with a similar device of different size to provide a different proportional mixture of fuel.

These and other objects will become more apparent as the following detailed description of my invention proceeds with reference to the drawing illustrating one embodiment thereof.

Figure 2:
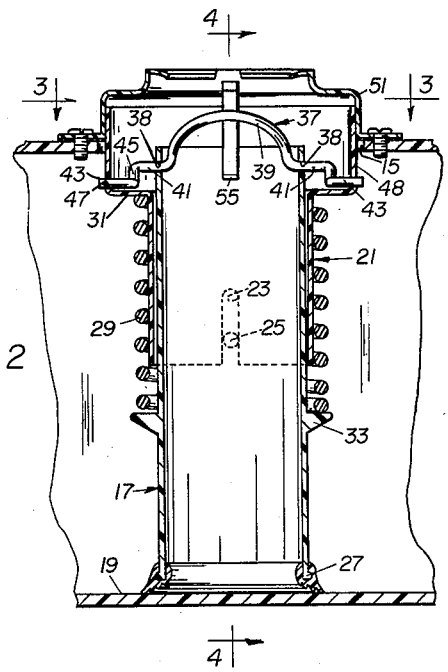
Figure 3:
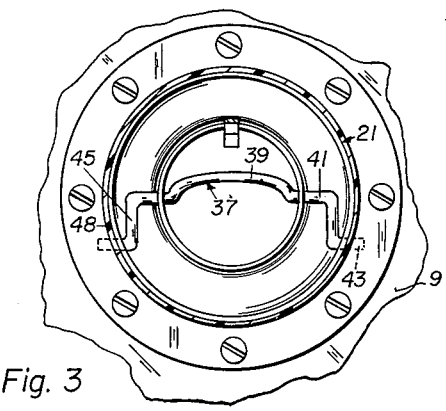
Figure 4:
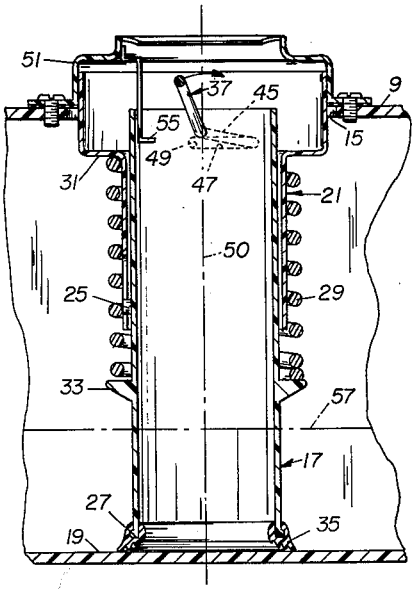
Figure 5:
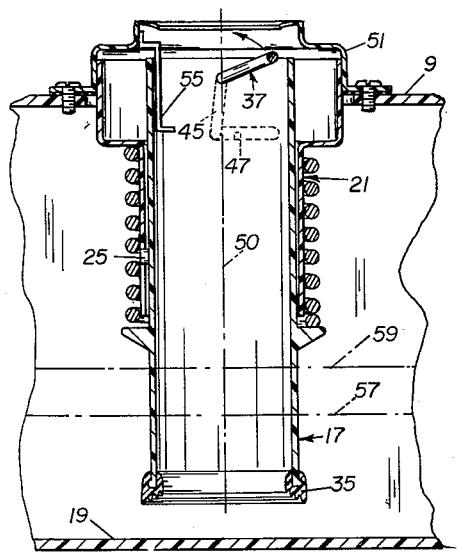

In the drawing:
FIG. 1 is a perspective view of a fuel tank embodying my invention, cut away at one end to show the proportional measuring and mixing unit;
FIG. 2 is an enlarged sectional elevation of the measuring and mixing unit in its downward position;
FIG. 3 is a fragmentary plan view of the opening in the top surface of the fuel tank taken along the line 3—3 of FIG. 2;
FIG. 4 is an enlarged sectional elevation of the measuring and mixing unit taken along the line 4—4 of FIG. 2; and
FIG. 5 is an enlarged sectional elevation of the measuring and mixing unit in its upward position.

Referring first to FIG. 1, a fuel tank or container 7 that is particularly adapted for use with an outboard motor is shown having a conventional rectangular configuration. The tank has straight sides and thus has a uniform cross-sectional area throughout its height, the importance of which will be pointed out below. The tank has a top surface 9 provided with a carrying handle 11. The tank itself is of a type suitable for being manufactured from either heavy gauge metal or molded plastic-type material. It will be apparent, as the description proceeds, that the other structural elements of my invention also may be made from either metal or molded plastic but are especially suitable for inexpensive formation from molded plastic. I also provide a discharge outlet adapted for a standard fuel hose connection 13, which forms no part of my invention, but which carries fuel mixture to the motor. I prefer placing it on the top surface of the tank for easy access and to prevent leakage from the tank when it is disconnected from the motor.

The top surface of the tank has an opening 15 therein, preferably round, through which the contents of the tank is poured and within which the device of my invention is mounted. Vertically positioned within the tank in substantial alignment with the opening is an elongated hollow container 17 open at both ends. In the preferred embodiment illustrated, the container comprises a hollow cylindrical tube having a uniform cross-sectional area throughout its length, which is substantially equal to the height of the tank. The diameter of the tube is small enough to allow the upper end of the tube to fit within the tank opening when raised to an upward position within the tank.

The capacity of the tube is a predetermined proportion of the capacity of the fuel tank. Since the tank and tube respectively preferably have uniform cross-sectional areas throughout the height of the tank this same proportion or ratio will exist between the respective cross-sectional areas at any given height of the tube above the bottom surface 19 of the tank. This is the feature making it possible to fill an already partially filled tank with the correct mixture. For example, a recommended fuel mixture is one fifth pint of oil to every gallon of gasoline or one part of oil to forty parts of gasoline. Since the tube is inside the tank, the proper ratio of oil to oil and gasoline mixture is $1/1+40=1/41$, that is, in a filled fuel tank $1/41$ of the fuel mixture should be oil. It follows, therefore, that the cross-sectional area of the tube at any point should bear the ratio of $1/41$ of the cross-sectional area of the tank at that point. No matter what configuration of tube is used, it is desirable to maintain a constant predetermined ratio between the cross-sectional areas of the tube and tank at any given tank height to permit the correct ratio of oil and gasoline to be added regardless of the initial fuel level in the tank. Obviously, the simplest configuration to accomplish this is a tank and tube each of which has a constant cross-sectional diameter throughout its height.

Guide means hold the tube 17 vertically within the tank, preferably with the longitudinal axis of the tube coinciding with the axis of the opening 15. As guide means I provide the cylindrical tube guide 21 which encircles the outside of the tube 17 and restricts lateral movement thereof. Its enlarged upper end fits within the tank opening and is fixed to the inside surface of an outer dome member 51. A keyway 23 is provided in the tube guide to receive a small key or projection 25 on the outside of the tube. This prevents any rotation of the tube with respect to the tube guide, which is desirable for proper raising of the tube to its upward position.

A spring means is provided to bias the tube downwardly so that either the tube's lower edge 27 or sealing means attached thereto will be brought into firm engagement with the inner bottom surface 19 of the tank. For this purpose I provide the coil spring 29 which encircles the outside of the tube guide 21 and abuts a shoulder 31 of the tube guide provided near its upper end. A circumferential flange 33 or similar projecting means are provided on the outside of the tube against which the lowermost portion of the spring bears so as to maintain the tube in a downwardly biased position.

Interposed between the lower edge of the tube and the bottom surface of the tank is a sealing means so that when the tube is in its downward position the tube and bottom of the tank will form a substantially liquid tight container. While I prefer to use a resilient neoprene ring 35 affixed over the lower edge of the tube for this purpose, for reasons of simplicity and economy, it is clear that other sealing means may be used, such as a gasket or the like affixed to the inside bottom surface of the tank itself. However, the latter sealing method would require more accurate machining of the lower edge of the tube. In fact, if the inside bottom surface of the tank is substantially flat and the lower edge of the tube sufficiently machined so that there will be no appreciable loss of oil from the tube during the short interval it is maintained in its downward position, this in itself would be sufficient sealing means without any additional structure.

The tube is made vertically movable within the tank from its downwardly biased position to a predetermined upward position whereby the lower edge of the tube will be moved a sufficient distance from the bottom of the tank to permit a quick flow of liquid from the tube into the tank. When in its upward position as in FIG. 5, the upper portion of the tube will actually be within the tank opening 15 and the dome 51. To raise the tube I provide a lifting means, such as the lever acting bail 37, pivotally mounted within and projecting through opposed apertures 38 preferably spaced 180 degrees apart in the upper sidewall of the tube.

The bail itself comprises a handle portion 39, which spans the upper end of the tube and projects slightly upward within the tank opening, enabling a person to conveniently reach through the opening with a finger to grasp and manipulate the handle. The tube bearing portions 41 of the bail, which project through the apertures in the tube sidewall, are approximately in axial alignment with one another and lie in a substantially horizontal plane. The two opposed bail ends 43 are also in approximate axial alignment and this axis lies substantially, but not necessarily, parallel to the axis of the tube bearing portions. However, the latter axis is spaced from the former a distance substantially equal to the distance the lower edge of the tube will be spaced above the bottom surface of the tank when the tube is locked in its uppermost position. The end portions of the bail are connected to the tube bearing portions by intermediate portions 45 which in my preferred embodiment lie at substantially right angles to the end and intermediate portions. Obviously various other configurations of the bail are workable, so long as the tube contacting portions are spaced a sufficient distance from the end portions and the handle provides enough leverage to lift the tube against the spring pressure.

The ends 43 of the bail are slidably mounted within substantially horizontal eccentric guideways or slots 47 provided within the upper enlarged cylindrical wall portion 48 of the tube guide. Obviously the slots could be provided in any fixed member alongside the tube wall adjacent the tube apertures but for reasons of simplicity and economy the embodiment shown is preferable. The slots as shown also serve as air vents to permit the escape of air from the tank when the gasoline is added, otherwise, additional holes in the tank would have to be provided.

The slots serve principally as locking means by which the tube will be held selectively in its upward position against the spring pressure when the bail ends 43 are cooperatively engaged within the slots and moved by means of the bail handle to one end 49 of each slot nearest a vertical plane 50 through the tube axis and the opposed tube apertures. Although the end 49 of each slot should be located near the plane 50 for maximum tube lift, it is important that the ends 49 of the slots be on the opposite side of the plane 50 from the other ends of the same slots. Otherwise, if the slot ends 49 are on the same side of the plane as the other ends, the tube will not lock in its position and accidental release of the tube to its downward position may result, unless a notch is provided in the bottom of the slot within which the bail ends could be held. To insure against premature release of the tube in any event, a slight depression (not shown) may be made in the bottom surface of each slot at the end 49 nearest the plane 50. It is obviously important that the other ends of the slots 47 be far enough to the other side of the vertical plane 50 to permit the lower edge of the tube to be held against the bottom of the tank by the full force of the spring when the tube is lowered to its downward position.

As will be obvious from FIG. 5 of the drawing, the lower cylindrical portion of the tube guide 21 should not extend so low about the tube as to interfere with its upward movement by striking against the tube flange 33 before the tube reaches its upward locked position. For the same reason, the keyway 23 in the tube guide must extend far enough upward to allow the tube to reach its upward position before the key 25 contacts the upper extremity of the keyway.

The outer dome 51 is shown extending from the top surface of the tank over the tank opening and has an opening in its upper end. It is attached by screws to the upper surface 9 of the tank surrounding the circular opening 15 and it has its upper portion adapted to receive a cap 53 which prevents the spillage of liquid or leakage of fumes from the tank once the filling operation is completed and the tank is ready for use.

The opening in the upper end of the dome is made large enough to permit easy access to the bail handle 39 by the operator's finger projecting downward through the opening. A gasket is provided between the outer dome and the top surface of the tank to prevent leakage if screws are used. The screws allow removal of the outer dome and thus removal of the entire assembly, thereby permitting cleaning and repair of the tank if necessary. This removal feature also permits insertion of another tube unit if a different proportional mixture of fuel is desired, simply by replacing the present unit with an entirely different one comprising the tube, tube guide, spring, and tube bail.

A level marker 55, as shown in FIGS. 4 and 5, may be welded to the inner surface of the outer dome opening so that its lower portion extends inside the tube to indicate the proper level to which oil and gasoline should be added, allowing sufficient room for expansion between the marker and top of the tank.

It should be apparent from the description of the invention that other equivalent means may be provided to obtain the same results. For example, rather than the one piece cylindrical guide shown, the tube guide means could comprise three or four strips extending from the top to the bottom of the tank surrounding the tube itself, or else the guide could project up inside the tube from the bottom of the tank. However, the tube guide shown is preferred because of its simple, easy to manufacture design, which combines the functions of a tube guide, spring seat and bail locking device into one member. It should also be obvious that the outer dome, rather than being screwed to the top surface of the tank, could be made removable by threading it into the top surface of the tank adjacent the opening therein. In addition, other tube and tank configurations having their cross-sectional areas of a predetermined ratio could be used.

The foregoing structure provides a tank that is quickly and easily filled with the correct fuel mixture in accordance with the objects of my invention as follows. When a cap (not shown) is removed from the outer dome, the tube and bail will be in the position shown in FIG. 5, wherein the lower edge of the tube 17 is a considerable distance above the bottom 19 of the tank. In this position it is apparent that the level 57 of the remaining fuel mixture will be the same both within and without the interior of the tube. To refill the tank, the operator grasps the bail handle 39 with a finger and pulls it toward the central axis of the tube in the direction of the arrow. This movement of the handle will move the two ends 43 of the bail within the slot 47 in a direction opposite that of the handle movement because the tube bearing portion 41 of the bail, being within the tube aperture, is restricted against linear movement and thus acts as the pivot point. When the ends 43 of the bail get just beyond the central plane 50 the spring will force the tube against the bottom of the tank and the sealing means will make the tube substantially liquid tight.

With the tube in its downward position, as shown in FIG. 4, the bail ends 43 will be at the ends of their respective slots opposite the slot ends 49 and furthest from the central plane 50 and the bail handle 39 will be generally at the opposite side of the tank opening from its initial position. However, the position of the bail handle with respect to the rest of the bail is obviously a matter of choice and convenience. In the downward position, oil is poured through the opening into the tube until the tube is filled up to the level marker 55. Then the bail handle is pulled in the direction of the arrow indicated in FIG. 4, which will force the bail ends 43 to slide back toward the end 49 of the slot nearest the central plane, which in turn raises the portion 41 of the bail and thus the tube to its upward locked position shown in FIG. 5. With the tube again raised the newly added oil therewithin will flow out beneath the lower edge of the tube to the level 59 indicated in FIG. 5. Thereafter the tube is kept in its raised position while the remainder of the tank is filled with gasoline to the level marker. The filled tank will automatically contain the correct proportional mixture of fuel oil and gasoline. With the tube remaining in its upward locked position, the cap is secured to the outer dome and the fuel tank is ready for use. Suitable markings may be used on the outside surface of the dome 51 to indicate the correct position of the bail for the addition of each liquid. The entire operation requires only two simple movements of the bail handle by one finger and may be performed in a matter of a few seconds, without calculation, regardless of the initial fuel level.

In the foregoing description, the invention has been described with reference to certain particular preferred embodiments, though it is to be understood that the specific details shown are merely illustrative and that the invention may be carried out in other ways without departing from the true spirit and scope of the following claims.

I claim:

1. A proportional measuring and mixing device comprising;
   a tank having an opening in its top surface;
   a hollow tube open at both ends movably mounted within said tank in alignment with said opening;
   said tube being vertically movable to an upward and a downward position within said tank;
   the respective cross-sectional areas of said tube and tank at any height of said tank being of a predetermined constant ratio;
   spring means to bias said tube downwardly;
   sealing means between the lower edge of said tube and the bottom of said tank whereby liquid will not pass beneath said lower edge when said tube is in its downward position;
   lifting means to raise said tube away from the bottom of said tank a sufficient distance to allow liquid to flow freely beneath the lower edge of said tube; and
   locking means to cooperate with said lifting means in selectively holding said tube in an upward position.

2. A proportional measuring and mixing device comprising;
   a tank having an opening in its top surface;
   a hollow tube open at both ends movably mounted within said tank in alignment with said opening;
   said tube being of a length substantially equal to the height of said tank;
   said tube and tank having respective cross-sectional areas of a predetermined constant ratio throughout the height of said tank;
   guide means adjacent said tube and in fixed relation to said tank to prevent lateral and rotational movement of said tube;
   spring means to spring bias said tube downwardly whereby the lower edge of said tube will engage the inside bottom surface of said tank;
   sealing means interposed between the bottom surface of said tank and the lower end of said tube whereby said tube will form a fluid tight container when in its downwardly biased position;
   lifting means in conjunction with said tube to raise said tube upwardly away from its downwardly biased position a sufficient distance to disengage the lower edge of said tube from the bottom surface of said tank and permit liquid to flow freely therebetween; and
   locking means cooperatively engaged with said lifting means to hold said tube in an upward position when said lifting means raises said tube a predetermined distance upwardly away from the bottom of said tank.

3. In a proportional measuring and mixing tank having an opening in its top surface the invention comprising;
   a tube open at both ends movably mounted within said tank in alignment with said opening;
   said tube having a length substantially equal to the height of said tank;
   said tube having a cross-sectional area of a constant predetermined proportion of the cross-sectional area of said tank throughout its height;
   said tube being vertically movable to an upward and downward position within said tank;
   said tube having its lower edge adapted to provide a substantially liquid tight seal with the bottom of said tank when said tube is in a downward position;
   guide means in fixed relationship to said tank to prevent lateral and rotational movement of said tube;
   lifting means pivotally connected to said tube to provide upward axial movement to said tube whereby the upper edge of said tube will move within said opening in said tank; and locking means on said tank cooperatively engaging said lifting means to hold said tube in a predetermined upward position whereby liquid will pass freely between the lower edge of said tube and the bottom of said tank.

4. In a proportional measuring and mixing tank having an opening in its top surface the invention comprising;

a tube open at both ends positioned within said tank in alignment with said opening;

said tube having a lower edge provided with sealing means; and said tube being biased downwardly;

whereby the lower edge of said tube engages the bottom of said tank in a substantially liquid tight relationship;

a lever acting bail to move said tube vertically within said tank to an upward position;

said bail being pivotally mounted within and projecting through two opposed apertures in said tube wall adjacent the upper end thereof;

said bail comprising;

a handle portion spanning the inside of said tube adjacent the upper end thereof;

two tube contacting portions respectively extending through said opposed apertures in said tube; and two end portions spaced from said tube contacting portions and slidably engaged within a slotted member having two opposed slots extending alongside said tube adjacent said tube apertures;

the slots in said slotted member being so located that said tube will be in its downwardly biased position when said ends of said tube are adjacent one end of said slots; and said tube will be held in its upward position when the ends of said bail are adjacent the opposite ends of said slots;

the ends of said bail being slidably movable within said slotted member by manual actuation of said handle portion of said bail.

5. A proportional measuring and mixing device comprising;

a tank having an opening in its top surface;

a tube mounted vertically within said tank in substantial alignment with said opening;

a lever acting bail pivotally mounted within said tube to move said tube vertically within said tank to predetermined upward and downward positions;

spring means to bias said tube in its downward position;

sealing means interposed between the lower edges of said tube and bottom of said tank so that the lower edge of said tube will be held in substantial liquid tight engagement with the bottom of said tank;

guide means to restrict said tube to a vertical movement only; and a slotted member to cooperatively receive the ends of said bail whereby said tube will be raised and held in its upward position when said bail is moved to a predetermined position; and a removable dome member extending upwardly from the top surface of said tank over said tank opening;

said dome having an opening in its upper end adapted to receive a removable cap; and said dome having an inside area large enough to receive the upper portion of said tube when said tube is in its upward position.

References Cited in the file of this patent
UNITED STATES PATENTS

| | | |
|---|---|---|
| 354,133 | Hammann | Dec. 14, 1886 |
| 845,804 | Martin | Mar. 5, 1907 |
| 2,161,060 | Kelsey | June 6, 1939 |
| 2,788,801 | Mowat | Apr. 16, 1957 |
| 2,814,308 | Mowat | Nov. 26, 1957 |

FOREIGN PATENTS

| | | |
|---|---|---|
| 752,750 | Great Britain | July 11, 1956 |